Feb. 16, 1937.  G. L. WENDT  2,071,011
PROCESS FOR MAKING A CONCENTRATED EXTRACT OF COFFEE
Filed Sept. 1, 1933
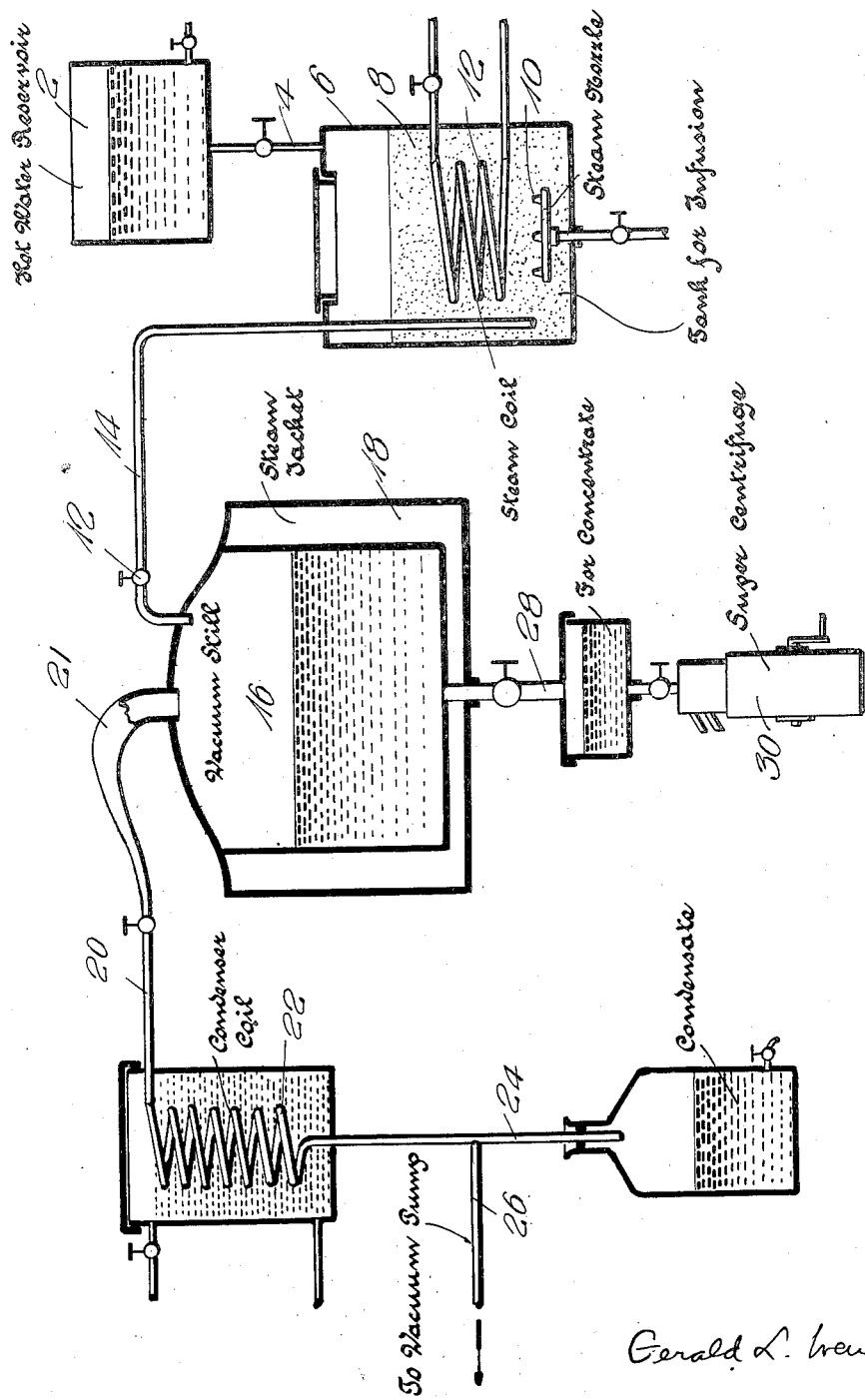
Inventor
Gerald L. Wendt
By Fisher Pedersen, Attorneys Patented Feb. 16, 1937

2,071,011

UNITED STATES PATENT OFFICE 2,071,011

PROCESS FOR MAKING A CONCENTRATED EXTRACT OF COFFEE

Gerald L. Wendt, New York, N. Y., assignor to Coffee Products Corporation, New York, N. Y., a corporation of New York Application September 1, 1933, Serial No. 687,887

17 Claims. (Cl. 99—71)

This invention is a concentrated coffee extract, and the process and apparatus for making it, and is an improvement over the process shown in my co-pending application, Ser. No. 326,408, patented September 5, 1933, No. 1,925,159.

The present invention includes some of the features of the process shown in the above-mentioned application. As a result, however, of experimentation and actual commercial practice, the present invention has been evolved, changes being made in certain steps, and in the proportion of parts, as will appear.

Broadly considered, the invention comprises first making a fairly strong infusion from ground, roasted coffee. Then this infusion is transferred to a vacuum kettle, where it is mixed with a small amount of glycerine, and a large part of the water removed by evaporating it off at a relatively low temperature.

The use of glycerine in this art is not broadly new, being shown, for example, in a rather different manner and quantity and function in the patent to Darrah 1,525,272 granted Feb. 3, 1925, as well as in my prior patent above referred to. Darrah proposes in the first part of his patent to extract the material being treated, such as tea, etc., with glycerine, or with glycerine and water. On page 3, beginning with line 70, Darrah describes a process where tea is heated with boiling water from 10 to 30 minutes which gives a brown colored muddy liquid to which glycerine is added as a preservative, and to prevent the deposition of a precipitate.

Applicant's use of glycerine is quite different. The applicant uses glycerine in the vacuum evaporation step as a "blanket" for the caffeol, the term "caffeol" here being used to indicate the volatile aromatic constituents of the coffee brew, which the prior art has realized must not be allowed to escape if the concentrate is to have the real coffee flavor. The presence of glycerine in the coffee infusion reduces the vapor pressure of the "caffeol" without substantially reducing the vapor pressure of the water and thereby reduces the amount of caffeol which distills over with the water. In the patent to Hamor and Trigg, for example, No. 1,292,458 of Jan. 28, 1919, the caffeol is allowed to pass off from the coffee infusion, but is recaptured by absorbing it in some fat or oil. The patent to Whitaker and Metzger 1,128,828 of Jan. 5, 1915, also uses this process of recapture of caffeol.

With the present invention, the glycerine, due to its function in lowering the vapor pressure of the caffeol and resultant "blanketing" effect, minimizes the escape of the caffeol.

Another important feature of the invention is the clarification and purification of the concentrated extract resulting from the evaporation treatment in the vacuum still. This extract usually contains some fine grounds, which are difficult to filter out, and it also contains fats and oils which it is important to remove in order to give a product that will keep. If these fats and oils stay in the extract they are apt to become rancid in time. According to this invention, therefore, the extract from the vacuum still is put through a centrifuge which operates at very high speed, the centrifuge being known in the art as a super-centrifuge, which removes the fine grounds and also removes the fats and oils and gives a marketable product. A small amount of preservative may, if desired, be added. The resulting product may be used as such, or it may be used in the making of a syrup for soda fountain use, as will be described.

Some of the main features of the invention having been thus outlined, the process will now be described in more detail:

The figures given below as to quantity represent present actual commercial practice and are, of course, illustrative and not restrictive of the invention. About 15 pounds of ground roasted coffee, in a suitable vessel, are steamed to saturation at atmospheric pressure. This steaming aids in the subsequent extraction of all of the flavoring constituents of coffee. Then 15 gallons of hot water are added, and circulation of the water maintained for a sufficient time to make a strong infusion. The countercurrent principle could be used in making the infusion, that is to say, successive batches of coffee are successively treated so that the grounds which have been extracted once or twice, for example, are treated with fresh hot water, while the fresh grounds are treated with an infusion that has already passed through and extracted the flavoring constituents from one or more prior batches of coffee grounds.

The hot water infusion is now transferred to a steam jacketed vacuum still and mixed with standard food grade glycerine in the proportion of 1 pound of glycerine to 15 gallons of infusion. The vacuum still is maintained under a fairly high vacuum, and at approximately the temperature of 125° F. This temperature should not be exceeded by any great amount, because the higher the temperature the greater the tendency of the volatile aromatic constituents of the coffee to pass off with the distillate.

The evaporation in the still is continued until the original batch of 15 gallons has been reduced to 1½ gallons, that is, to about one-tenth of its original volume. This concentrated extract is then put through a super-centrifuge, preferably one which operates at from 18,000 to 45,000 R. P. M., which removes not only the fine grounds and sediment but also the fats and oils, the removal of the grounds and sediment giving a bright, clear product, while the removal of the fats and oils greatly improves the keeping qualities of the extract. Unless the oils and fats are removed, they may become rancid. The extract may now be bottled, either with or without a small amount of preservative such, for example, as benzoate of soda or maleic acid.

A syrup may be made from the extract just described by adding 5 pounds of sugar to each half-gallon of coffee extract, this making a gallon of syrup. This syrup may be used by housewives or by dairies for making coffee flavored milk drinks and by soda fountains in making coffee drinks. When this syrup is used at the soda fountains, a little of the usual sweetening sugar syrup is usually added.

One of the important aspects of this invention is the manufacture of a concentrated coffee syrup for soda fountain use. To make soda fountain syrup, about 15 gallons of a strong coffee infusion is made as described above. This is divided into two batches, 9 gallons (about 60%) and 6 gallons (about 40%). The larger batch goes into the vacuum still with about 0.6 pound of food grade glycerine and is evaporated down to about $\frac{8}{10}$ths of a gallon (weight about 7½ pounds) of concentrate and this concentrate is clarified and purified, as above described, by putting it through a super-centrifuge, which removes the fine grounds, fats and oils.

The second or six gallon batch (weight about 50 pounds) of the original infusion (containing no glycerine) is also put through the super-centrifuge, in order to remove the fats, oils and fine grounds and then the two batches are mixed, together with about 60 pounds of sugar, thus giving about 12 gallons of fountain syrup. This may be sold to the soda fountain trade directly, or a little preservative such as benzoate of soda or maleic acid added.

An important modification of the process of making a soda fountain syrup is that the glycerine may be omitted. In this modification, 15 gallons of water infusion is made as before. Nine gallons of this infusion is put into the vacuum still, without glycerine, the water evaporated off under vacuum as before at about 125° F. This gives about $\frac{8}{10}$ths gallon of concentrate, which is centrifuged as before and mixed with 6 gallons of the original infusion, which has also been centrifuged and with about 60 pounds of sugar. The original infusion, not having been evaporated, contains a large amount of caffeol, entirely sufficient to give a good coffee flavor and aroma to any beverage made with this syrup, even though no glycerine was used in making the concentrate.

The accompanying drawing illustrates diagrammatically the preferred form of apparatus used. Referring now to this drawing wherein similar reference characters indicate similar parts:

A hot water reservoir 2 communicates by a pipe 4, with the infusion tank 6, which contains coffee grounds 8, a steam nozzle 10 and a steam coil 12. The steam nozzle 10 is for the preliminary steaming of the coffee grounds, as has been described.

After the infusion has been made, the valve 12 in the pipe 14 is opened, and the low pressure in the vacuum still 16 causes the infusion to be forced over into the still. The vacuum still is provided with a steam jacket 18 and with an exit pipe 20 for the distillate, pipe 20 connecting through a goose neck or the like 21 with the still, and leading to a condenser coil 22 and delivery pipe 24. The vacuum still 16 is subjected to a high vacuum by connecting it, as by pipe 26, to a vacuum pump of any suitable design.

The concentrate from the vacuum still may be drawn off through a pipe 28 and thence treated for the removal of fine grounds and fats and oils by passing it through the super-centrifuge 30, as has been described.

While the present preferred embodiments of the invention have been described in some detail, it should be understood that the invention is not limited to the precise details shown, but may be carried out in other ways, as falling within the scope of the claims.

I claim as my invention:

1. The process of making a concentrated coffee extract, comprising the steps of making a water infusion from ground, roasted coffee, dividing the infusion into two batches, evaporating one batch under relatively high vacuum and at a temperature not substantially exceeding 125° F. to give a highly concentrated product, and mixing this concentrated product with the other batch of the original infusion.

2. The process of making a syrup for soda fountain use and the like, comprising the steps of making a water infusion from ground, roasted coffee, dividing the infusion into two batches, evaporating one batch under relatively high vacuum and at a temperature not substantially exceeding 125° F. to give a highly concentrated product, treating both this concentrated product and the rest of the original infusion, for removing fats, oils and fine grounds, and mixing the two products so treated and a substantial amount of sugar, to make a syrup.

3. The process of making a syrup for soda fountain use and the like, comprising the steps of evaporating a water infusion of coffee under relatively high vacuum and at a temperature not substantially exceeding 125° F. to about one-tenth of its original volume, centrifuging the concentrate thus obtained for removing fats, oils and fine grounds, centrifuging a water infusion of coffee for removing fats, oils and fine grounds, and mixing the two centrifuged products and about an equal weight of sugar, to make a syrup.

4. The process of making a concentrated coffee extract, comprising the steps of making a water infusion from ground, roasted coffee, mixing with the infusion about 8/10 of 1% of glycerine, evaporating off the water under a partial vacuum, at a temperature not substantially exceeding 125° F., and centrifuging the concentrate for removing fats, oils and fine grounds.

5. The process of making a concentrated coffee syrup comprising the steps of making a water infusion from ground, roasted coffee, mixing with the infusion about 8/10 of 1% of glycerine, evaporating off the water under a partial vacuum, at a temperature not substantially exceeding 125° F. to about one-tenth of its original volume, centrifuging the concentrate for removing fats, oils and fine grounds and adding about 10 pounds of sugar to each gallon of concentrate.

6. The process of making a concentrated coffee extract, comprising the steps of mixing a water infusion of coffee with a small amount of glycerine, subjecting the mixture to evaporation under reduced pressure, mixing with the concentrate thus obtained a relatively dilute water infusion of coffee, to form a concentrate suitable for soda fountain use and the like.

7. The process of making a concentrated coffee extract, comprising the steps of mixing a water infusion of coffee with about 1% or less by weight of glycerine, subjecting the mixture to evaporation under reduced pressure, mixing with the concentrate thus obtained a relatively dilute water infusion of coffee, to form a concentrate suitable for soda fountain use and the like.

8. The process of making a concentrated coffee extract, comprising the steps of making a water infusion of coffee, adding thereto a small amount of glycerine, subjecting the mixture to evaporation under reduced pressure, at a temperature not substantially exceeding 125° F., centrifuging the concentrate thus obtained to remove fats and fine grounds, centrifuging a relatively dilute water infusion of coffee, to remove fats and fine grounds, and mixing the two centrifuged products, to produce a concentrated extract.

9. The process of making a concentrated coffee extract, comprising the steps of making a water infusion of coffee, mixing with the infusion about 1% or less by weight of glycerine, evaporating the mixture under reduced pressure, centrifuging the extract thus obtained for removing fats and fine grounds, centrifuging a portion of the original infusion for removing fats and fine grounds, and mixing the two centrifuged products with added sugar, for producing a concentrated coffee syrup suitable for soda fountain use and the like.

10. The process of making a concentrated coffee extract, comprising the steps of making a water infusion of coffee, dividing the infusion into two batches, adding to the first batch a small amount of glycerine, evaporating this batch under reduced pressure to give a concentrate, treating the concentrate to remove fats and fine grounds, treating the second batch of infusion to remove fats and fine grounds, and mixing the two batches to give a concentrated coffee extract.

11. The process of making a concentrated coffee extract, comprising the steps of making a water infusion of coffee, dividing the infusion into two batches, adding to the first batch less than 1% by weight of glycerine, evaporating this batch under reduced pressure to give a concentrate, treating the concentrate to remove fats and fine grounds, treating the second batch of infusion to remove fats and fine grounds, and mixing the two batches to give a concentrated coffee extract.

12. The process of making a concentrated coffee syrup, comprising the steps of making a water infusion of coffee, dividing the infusion into two batches, adding to the first batch about 8/10 of 1% by weight of glycerine, evaporating this batch under reduced pressure at a temperature not substantially exceeding 125° F. to give a concentrate, treating the concentrate to remove fats and fine grounds, treating the second batch of infusion to remove fats and fine grounds, and blending the two batches, together with a relatively large amount of sugar, to form a concentrated syrup particularly suitable for soda fountain use.

13. The process of making a concentrated coffee syrup, comprising the steps of treating roasted coffee with hot water to make a water infusion, dividing the water infusion into two batches, one about 60% and the other about 40% of the original infusion, adding about 1% or less by weight of glycerine to the larger batch and subjecting this batch to evaporation under reduced pressure to give a highly concentrated solution, subjecting this concentrated solution, and the other batch to high speed centrifuging for removing fats and fine grounds, and mixing the two centrifuged batches with each other, to form a concentrated product.

14. The process of making a concentrated coffee syrup, comprising the steps of treating roasted coffee with hot water to make a water infusion, dividing the water infusion into two batches, one about 60% and the other about 40% of the original infusion, adding less than 1% by weight of glycerine to the larger batch and subjecting this batch to evaporation under reduced pressure, at a temperature not substantially exceeding 125° F., to give a highly concentrated solution, subjecting this concentrated solution, and the other batch, to high speed centrifuging for removing fats and fine grounds, and mixing the two centrifuged batches with each other, and with a relatively large amount of sugar, to form a concentrated syrup suitable for soda fountain use and the like.

15. The process of making a concentrated coffee extract, comprising the steps of subjecting ground, roasted coffee to steaming, then adding hot water to the steamed grounds to make a water infusion, mixing the water infusion with less than 1% by weight of glycerine, subjecting the mixture to evaporation under reduced pressure, mixing with the concentrate thus obtained a portion of the original infusion, to form a concentrated extract.

16. The process of making a concentrated coffee extract, comprising the steps of subjecting ground, roasted coffee to steaming, making a hot water infusion with the steamed grounds, adding about 8/10 of 1% by weight of glycerine to the infusion, subjecting the mixture to evaporation under reduced pressure at a temperature not substantially exceeding 125° F., centrifuging the resulting concentrated product to remove fats and fine grounds, centrifuging a portion of the original infusion to remove fats and fine grounds, and mixing the two centrifuged products, and adding sugar, to make a concentrated syrup suitable for soda fountain use and the like.

17. The process of making a concentrated coffee extract, comprising the steps of making a water infusion from ground roasted coffee, evaporating off most of the water under a partial vacuum and at a temperature not substantially exceeding 125° F., and centrifuging the concentrate for removing fats and oils for improving the keeping qualities of the product.

GERALD L. WENDT.